US012676539B2

(12) United States Patent
Hung

(10) Patent No.: US 12,676,539 B2
(45) Date of Patent: Jul. 7, 2026

(54) POWER SUPPLY

(71) Applicant: ASUSTEK COMPUTER INC., Taipei (TW)

(72) Inventor: Ke-Jen Hung, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 169 days.

(21) Appl. No.: 18/813,363

(22) Filed: Aug. 23, 2024

(65) Prior Publication Data

US 2025/0350182 A1      Nov. 13, 2025

(30) Foreign Application Priority Data

May 9, 2024    (TW) .................................. 113117196

(51) Int. Cl.
*H02M 1/00* (2007.01)
*H02M 1/32* (2007.01)
(52) U.S. Cl.
CPC ........... *H02M 1/0009* (2021.05); *H02M 1/32* (2013.01); *H02M 1/325* (2021.05)
(58) Field of Classification Search
CPC ....... H02M 1/0009; H02M 1/32; H02M 1/325
See application file for complete search history.

(56) References Cited

U.S. PATENT DOCUMENTS 10,312,796 B1 * 6/2019 Chen ..................... H02M 3/155
2021/0143740 A1 * 5/2021 Oddicini .......... H02M 3/33507
2025/0112545 A1 * 4/2025 Ban ......................... H02M 1/32

FOREIGN PATENT DOCUMENTS

CN          106291174 B    1/2021
CN          112505562 A    3/2021
JP          200375492 A    3/2003

* cited by examiner

*Primary Examiner* — Lakaisha Jackson
(74) *Attorney, Agent, or Firm* — MUNCY, GEISSLER, OLDS & LOWE, P.C.

(57) ABSTRACT

A power supply is provided. The power supply includes an input terminal, an output terminal, a conversion circuit module with a circuit element, a first monitoring circuit, and a microprocessor. The first monitoring circuit is adapted to detect an operating state of the conversion circuit module, to generate a first detected value. The microprocessor is electrically coupled to the first monitoring circuit, and stores a first rated physical value and a maximum error quantity corresponding to the circuit element. The microprocessor is configured to estimate a first simulated operating physical value corresponding to the circuit element based on the first detected value; compare the first simulated operating physical value with the first rated physical value; and accumulate a quantity of times that the first rated physical value is exceeded, and enable a protection function when the quantity of times exceeds the maximum error quantity.

17 Claims, 5 Drawing Sheets

POWER SUPPLY

CROSS-REFERENCE TO RELATED APPLICATION

This application claims the priority benefit of Taiwan Application Serial No. 113117196, filed on May 9, 2024. The entirety of the above-mentioned patent application is hereby incorporated by reference herein and made a part of the specification.

BACKGROUND OF THE INVENTION

Field of the Invention

The disclosure relates to a power supply.

Description of the Related Art

Generally, a service life of a power supply ranges from about a few years to ten years. However, when the power supply is in a harsh service condition, such as an unstable AC input voltage or a high-temperature environment, a circuit element inside the power supply is prone to malfunction, resulting in a shortened service life of the entire power supply. It is difficult for a user to detect that the power supply is damaged.

However, a power supply used in a conventional power supply consumer electronic product is an analog circuit, and there is no physical value (in an embodiment, temperature, voltage, or current) monitoring circuit mounted, or the physical value monitoring circuit cannot perform intelligent computing with a microprocessor. Therefore, there is no conventional practice.

BRIEF SUMMARY OF THE INVENTION

The disclosure provides a power supply, adapted to supply power to an electronic device. The power supply includes an input terminal, an output terminal, a conversion circuit module, a first monitoring circuit, and a microprocessor. The input terminal receives an input power. The output terminal is adapted to be electrically coupled to the electronic device. The conversion circuit module is electrically coupled to the input terminal and the output terminal, adapted to convert the input power into an output power and provide the output power to the output terminal, and includes a circuit element. The first monitoring circuit is arranged on the conversion circuit module, and adapted to detect an operating state of the conversion circuit module, to generate a first detected value. The microprocessor is electrically coupled to the first monitoring circuit, and stores a first rated physical value and a maximum error quantity corresponding to the circuit element. The microprocessor is configured to estimate a first simulated operating physical value corresponding to the circuit element based on the first detected value; compare the first simulated operating physical value with the first rated physical value; and accumulate a first quantity of times that the first simulated operating physical value exceeds the first rated physical value, and enable a protection function when the first quantity of times exceeds the maximum error quantity.

The disclosure provides another power supply, adapted to supply power to an electronic device. The power supply includes an input terminal, an output terminal, a conversion circuit module, a first monitoring circuit, and a microprocessor. The input terminal receives an input power. The output terminal is adapted to be electrically coupled to the electronic device. The conversion circuit module is electrically coupled to the input terminal and the output terminal, and adapted to convert the input power into an output power and provide the output power to the output terminal, and includes a plurality of circuit elements. The first monitoring circuit is arranged on the conversion circuit module, and adapted to detect an operating state of the conversion circuit module, to generate a first detected value. The microprocessor is electrically coupled to the first monitoring circuit, and stores a plurality of first rated physical values and a plurality of maximum error quantities corresponding to the circuit elements respectively, where the microprocessor is configured to: estimate a first simulated operating physical value corresponding to each of the circuit elements based on the first detected value; compare the first simulated operating physical value corresponding to each of the circuit elements with the corresponding first rated physical value; accumulate a quantity of times that the first simulated operating physical value corresponding to each of the circuit elements exceeds the corresponding first rated physical value; and enable a protection function when the quantity of times of any one of the circuit elements exceeds the corresponding maximum error quantity.

The disclosure provides still another power supply, adapted to supply power to an electronic device. The power supply includes an input terminal, an output terminal, a conversion circuit module, a first monitoring circuit, a second monitoring circuit, and a microprocessor. The input terminal receives an input power. The output terminal is adapted to be electrically coupled to the electronic device. The conversion circuit module is electrically coupled to the input terminal and the output terminal, adapted to convert the input power into an output power and provide the output power to the output terminal, and includes a circuit element. The first monitoring circuit is arranged on the conversion circuit module, and adapted to detect an operating state of the conversion circuit module, to generate a first detected value. The second monitoring circuit is arranged on the conversion circuit module, and adapted to detect an operating state of the conversion circuit module, to generate a second detected value. The microprocessor is electrically coupled to the first monitoring circuit and the second monitoring circuit, and stores a first rated physical value, a second rated physical value, and a maximum error quantity corresponding to the circuit element, where the microprocessor is configured to: estimate a first simulated operating physical value corresponding to the circuit element based on the first detected value and a second simulated operating physical value corresponding to the circuit element; compare the first simulated operating physical value with the first rated physical value, and compare the second simulated operating physical value with the second rated physical value; accumulate a first quantity of times that the first simulated operating physical value exceeds the first rated physical value; accumulate a second quantity of times that the second simulated operating physical value exceeds the second rated physical value, and enable a protection function when a sum of the first quantity of times and the second quantity of times exceeds the maximum error quantity.

A power supply provided in the disclosure includes a monitoring circuit, which is adapted to detect an operating physical value (in an embodiment, a voltage, a current, or a temperature) of a conversion circuit module. A microprocessor estimates a simulated operating physical value of a key circuit element in the conversion circuit module by using a detected operating physical value, and compares the simulated operating physical value with a rated physical value of the circuit element. In this way, functions of determining safety of the power supply, estimating a service life of the power supply, and actively giving a warning are provided without actually detecting an operating physical value of the circuit element. In addition, according to an embodiment of the disclosure, a single monitoring circuit is used, to generate simulated operating physical values corresponding to a plurality of different circuit elements for determining. This is beneficial to improving determining accuracy and reducing monitoring costs.

DETAILED DESCRIPTION OF THE EMBODIMENTS

Specific implementations of the disclosure are described in detail below with reference to the accompanying drawings. Advantages and features of the disclosure are more apparent from the following descriptions and application patent scope. It should be noted that, the drawings are drawn by using an extremely simplified form and imprecise proportion, which are only used for conveniently and clearly assisting in explaining the objective of embodiments of the disclosure.

Figure 1:
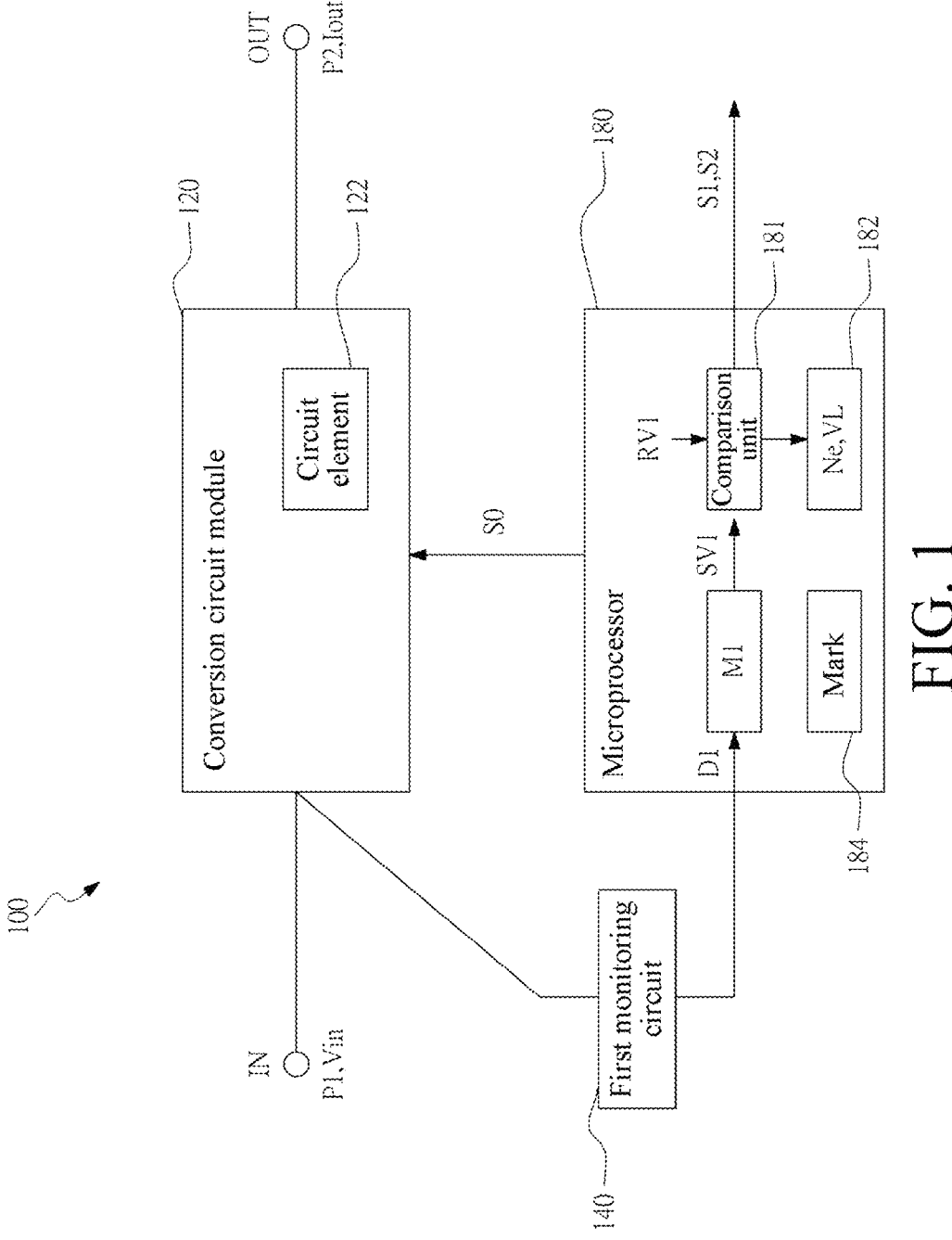
FIG. 1 is a schematic block diagram of a power supply according to a first embodiment of the disclosure.

FIG. 1 is a schematic block diagram of a power supply 100 according to a first embodiment of the disclosure. The power supply 100 is adapted to supply power to an electronic device (not shown in the figure). In an embodiment, the power supply 100 is a power supply of a mobile device, and adapted to supply power to an electronic device such as a notebook computer or a tablet computer. However, the disclosure is not limited thereto.

As shown in the figure, the power supply 100 includes an input terminal IN, an output terminal OUT, a conversion circuit module 120, a first monitoring circuit 140, and a microprocessor 180.

The input terminal IN receives an input power P1, where the input power P1 has an input voltage Vin. The output terminal OUT is adapted to generate an output power P2, where the output power P2 has an output current Iout, and is adapted to supply power to the electronic device.

The conversion circuit module 120 is electrically coupled to the input terminal IN and the output terminal OUT, and adapted to convert the input power P1 into the output power P2 and provide the output power P2 to the output terminal OUT. The conversion circuit module 120 includes a circuit element 122. The circuit element 122 is a capacitor, a semiconductor element (in an embodiment, a gold-oxygen half-field-effect transistor element, a rectifier wafer, or a control wafer) or the like for power conversion.

The first monitoring circuit 140 is arranged on the conversion circuit module 120, and adapted to detect an operating state of the conversion circuit module 120, to generate a first detected value D1. In an embodiment, the first monitoring circuit 140 is a voltage monitoring circuit, which is electrically coupled to the input terminal IN, to detect an input voltage Vin of the conversion circuit module 120. In this case, the first detected value D1 generated by the first monitoring circuit 140 is a detected voltage value.

The microprocessor 180 is electrically coupled to the first monitoring circuit 140, and stores a first rated physical value RV1 and a maximum error quantity Ne corresponding to the circuit element 122. When the first detected value D1 is the detected voltage value, the first rated physical value RV1 is a rated voltage value.

The microprocessor 180 estimates a first simulated operating physical value SV1 corresponding to the circuit element 122 based on the first detected value D1. When the first detected value D1 corresponds to an operating voltage of the conversion circuit module 120, the first simulated operating physical value SV1 is a simulated operating voltage value.

In an embodiment, the microprocessor 180 estimates, by using an intelligent algorithm M1 built in the microprocessor 180, the first simulated operating physical value SV1 (namely, the simulated operating voltage value) based on the first detected value D1. The intelligent algorithm M1 presents a correspondence between potential of the first monitoring circuit 140 at a monitoring position and potential of the circuit element 122 in a circuit architecture of the conversion circuit module 120. In an embodiment, the intelligent algorithm M1 is established through thermal simulation, circuit simulation, data modeling, machine learning, or the like.

After the first simulated operating physical value SV1 is obtained, the microprocessor 180 compares the first simulated operating physical value SV1 with the first rated physical value RV1 by using a comparison unit 181 inside the microprocessor, and accumulates a quantity of times that the first simulated operating physical value SV1 exceeds the first rated physical value RV1. In an embodiment, the microprocessor 180 stores, in a memory 182, the quantity of times that the first simulated operating physical value SV1 exceeds the first rated physical value RV1.

As the power supply 100 operates, when the quantity of times accumulated by the microprocessor 180 exceeds the maximum error quantity Ne, the microprocessor 180 enables a protection function, to prevent the power supply 100 or the electronic device from being damaged.

In an embodiment, the protection function is a current limiting function, mainly to limit the output current Iout of the power supply 100, thereby limiting output power of the power supply 100. Specifically, the microprocessor 180 generates a control signal S0 to control output power of the conversion circuit module 120. In an embodiment, the protection function is to generate a warning signal S1, namely, a light signal. The warning signal is generated by a warning light configured in the power supply 100, or is generated by the electronic device connected to the power supply 100. In an embodiment, the protection function is to transmit a warning message S2 to the electronic device, and present the warning message on an operating interface. In an embodiment, the warning message S2 is directly presented on a screen of the electronic device to alert a user.

The microprocessor 180 in this embodiment stores the first rated physical value RV1 (namely, the rated voltage value) corresponding to the circuit element 122 and the maximum error quantity. In addition, the microprocessor 180 further stores a service life value VL corresponding to the circuit element 122, and includes a mark 184. The microprocessor accumulates operating time of the circuit element 122, and when the operating time exceeds the service life value VL, the microprocessor 180 enables the protection function, and records this in the mark 184. Further, in other embodiments, when the quantity of times accumulated by the microprocessor 180 exceeds the maximum error quantity Ne, the microprocessor 180 enables the protection function, and also records this in the mark 184.

In an embodiment, the service life value VL is a changing value, and is affected by the quantity of times that the first simulated operating physical value SV1 exceeds the first rated physical value RV1. The microprocessor 180 estimates, by using the intelligent algorithm M1 built in the microprocessor 180, the service life value VL based on the quantity of times that the first simulated operating physical value SV1 exceeds the first rated physical value RV1 and a severity degree. Specifically, the service life value VL gradually decreases as the quantity of times that the first simulated operating physical value SV1 exceeds the first rated physical value RV1 increases.

Figure 2:
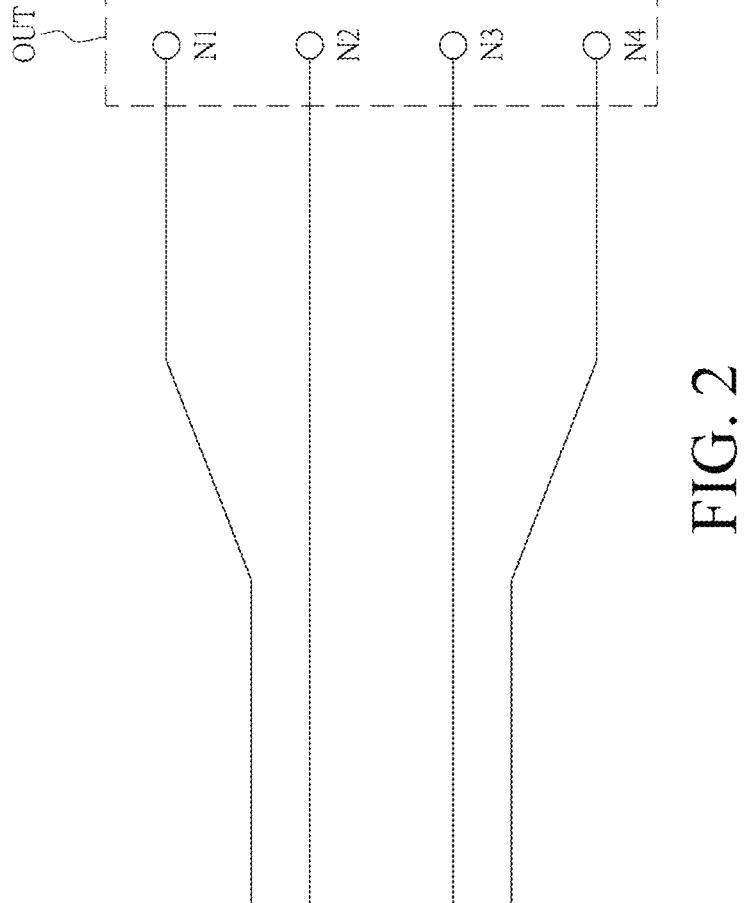
FIG. 2 is a schematic diagram of an embodiment of an output terminal of the power supply in FIG. 1.

FIG. 2 is a schematic diagram of an embodiment of the output terminal OUT of the power supply 100 in FIG. 1.

In an embodiment, the output terminal OUT includes two power supply contacts N1 and N2 and two signal transmission contacts N3 and N4. The power supply 100 supplies power to the electronic device through the power supply contacts N1 and N2 of the output terminal OUT, and communicates with the electronic device through the signal transmission contacts N3 and N4 of the output terminal OUT. In this way, the electronic device reads information in the beacon 184 through the signal transmission contacts N3 and N4, to determine whether the power supply 100 has a safety problem.

In this way, when there is a requirement of updating data such as the first rated physical value RV1 or the maximum error quantity Ne, the microprocessor 180 in the power supply 100 in the disclosure directly receives, by using the electronic device, update data through the signal transmission contacts N3 and N4, to update the first rated physical value RV1 or the maximum error quantity Ne. In this case, the power supply 100 does not need to be sent back to an original factory to update a setting.

Figure 3:
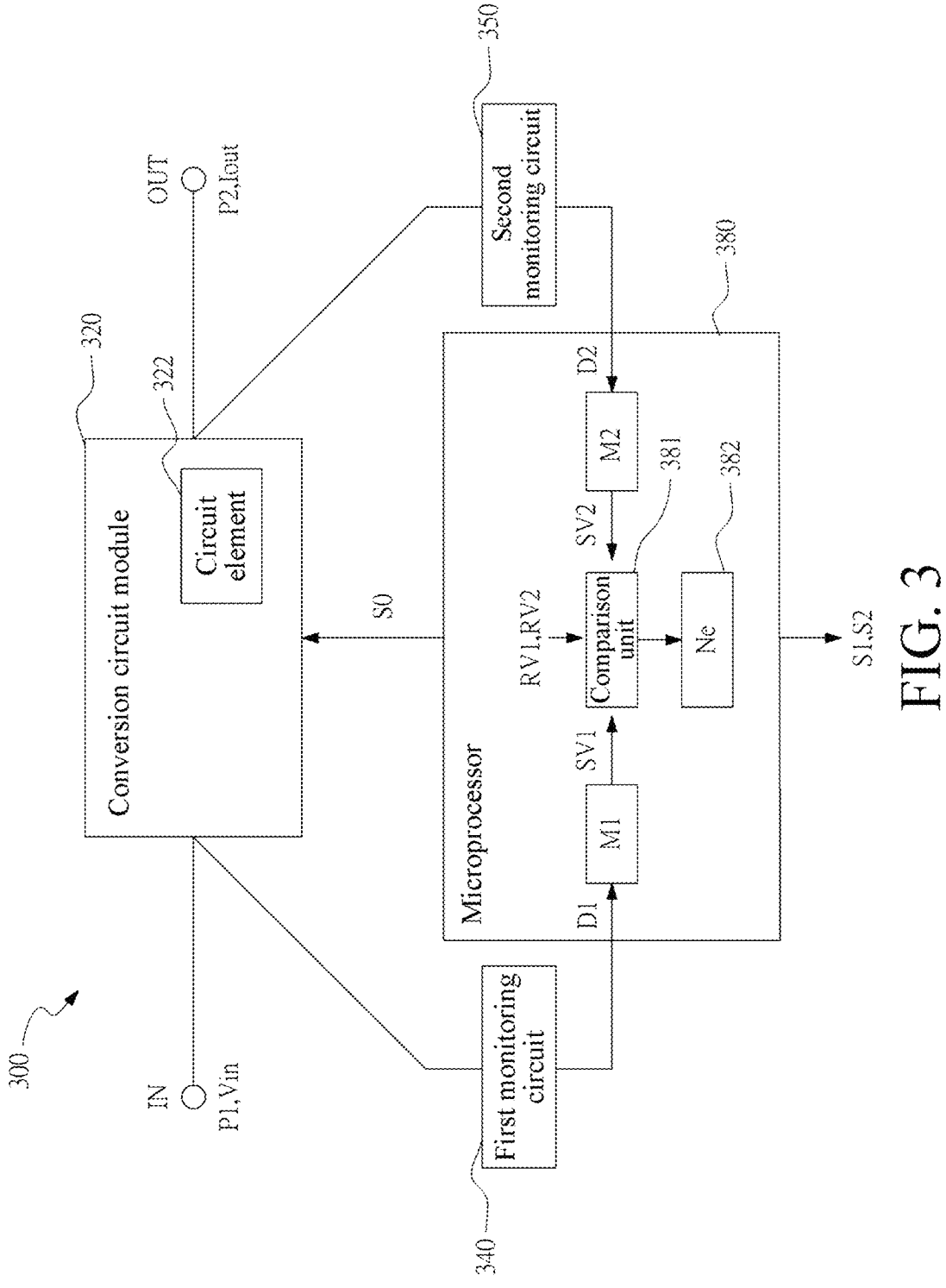
FIG. 3 is a schematic block diagram of a power supply according to a second embodiment of the disclosure.

FIG. 3 is a schematic block diagram of a power supply 300 according to a second embodiment of the disclosure.

Compared with the embodiment in FIG. 1, the power supply 300 in this embodiment further includes a second monitoring circuit 350 in addition to a first monitoring circuit 340. The second monitoring circuit 350 is arranged on a conversion circuit module 320, and adapted to detect an operating state of the conversion circuit module 320, to generate a second detected value D2.

In an embodiment, the second monitoring circuit 350 is a current monitoring circuit, which is electrically coupled to an output terminal OUT, to detect an output current Iout of the conversion circuit module 320. In this case, the second detected value D2 generated by the second monitoring circuit 350 is a detected current value.

In conjunction with the first monitoring circuit 340 and the second monitoring circuit 350 arranged in the power supply 300, a microprocessor 380 stores a first rated physical value RV1, a second rated physical value RV2, and a maximum error quantity Ne of a circuit element 322. When a first detected value D1 corresponds to an operating voltage of the conversion circuit module 320, the first rated physical value RV1 is a rated voltage value. When the second detected value D2 corresponds to an operating current of the conversion circuit module 320, the second rated physical value RV2 is a rated current value.

The microprocessor 380 estimates a first simulated operating physical value SV1 corresponding to the circuit element 322 based on the first detected value D1. In addition, the microprocessor 380 further estimates a second simulated operating physical value SV2 corresponding to the circuit element 322 based on the second detected value D2. When the first detected value D1 corresponds to the operating voltage of the conversion circuit module 320, the first simulated operating physical value SV1 is a simulated operating voltage value. When the second detected value D2 corresponds to the operating current of the conversion circuit module 320, the second simulated operating physical value SV2 is a simulated operating current value.

In an embodiment, the microprocessor 380 estimates, by using an intelligent algorithm M2 built in the microprocessor 380, the second simulated operating physical value SV2 (namely, the simulated operating current value) based on the second detected value D2. The intelligent algorithm M2 presents a correspondence between a current of the second monitoring circuit 350 at a monitoring position and a current of the circuit element 322 in a circuit architecture of the conversion circuit module 320. In an embodiment, the intelligent algorithm M2 is established through thermal simulation, circuit simulation, data modeling, machine learning, or the like.

In an embodiment, estimation of the second simulated operating physical value SV2 also relates to the first detected value D1 generated by the first monitoring circuit 340. In other words, the first detected value D1 is also a parameter of the intelligent algorithm M2.

After the first simulated operating physical value SV1 and the second simulated operating physical value SV2 are obtained, the microprocessor 380 compares the first simulated operating physical value SV1 with the first rated physical value RV1 by using a comparison unit 381 inside the microprocessor, and compares the second simulated operating physical value SV2 with the second rated physical value RV2. When the first detected value D1 corresponds to the operating voltage of the conversion circuit module 320, that the first simulated operating physical value SV1 exceeds the first rated physical value RV1 is considered as an overvoltage condition. When the second detected value D2 corresponds to the operating current of the conversion circuit module 320, that the second simulated operating physical value SV2 exceeds the second rated physical value RV2 is considered as an overcurrent condition.

The microprocessor 380 further accumulates a quantity of times that the first simulated operating physical value SV1 exceeds the first rated physical value RV1, and a quantity of times that the second simulated operating physical value SV2 exceeds the second rated physical value RV2. In addition, the microprocessor 380 stores the quantities of detected errors in a memory 382. When one of the quantities of times accumulated by the microprocessor 380 exceeds the maximum error quantity Ne, the microprocessor 380 immediately enables a protection function.

In the foregoing embodiment, a same maximum error quantity Ne is set for a case in which the first rated physical value RV1 is exceeded and a case in which the second rated physical value RV2 is exceeded. However, the disclosure is not limited thereto. Considering that various error conditions have different degrees of impact on the circuit element 322, in other embodiments, the microprocessor 380 stores a first maximum error quantity corresponding to that the first rated physical value RV1 is exceeded and a second maximum error quantity corresponding to that the second rated physical value RV2 is exceeded. The microprocessor 380 accumulates that the first simulated operating physical value SV1 exceeds the first rated physical value RV1 to obtain a first quantity of times, and accumulates that the second simulated operating physical value SV2 exceeds the second rated physical value RV2 to obtain a second quantity of times. The microprocessor 380 enables the protection function when the first quantity of times exceeds the first maximum error quantity or the second quantity of times exceeds the second maximum error quantity.

In addition, in this embodiment, when the accumulated quantity of times that the first simulated operating physical value exceeds the first rated physical value RV1 or the accumulated quantity of times that the second simulated operating physical value exceeds the second rated physical value exceeds the maximum error quantity Ne, the microprocessor 380 enables the protection function. However, the disclosure is not limited thereto. In other embodiments, when the first quantity of times that the first simulated operating physical value SV1 exceeds the first rated physical value RV1 is accumulated, the second quantity of times that the second simulated operating physical value SV2 exceeds the second rated physical value RV2 is accumulated, and a sum of the first quantity of times and the second quantity of times exceeds the maximum error quantity Ne, the microprocessor 380 enables the protection function, to consider cumulative risks caused by different error conditions to the circuit element 322.

Figure 4:
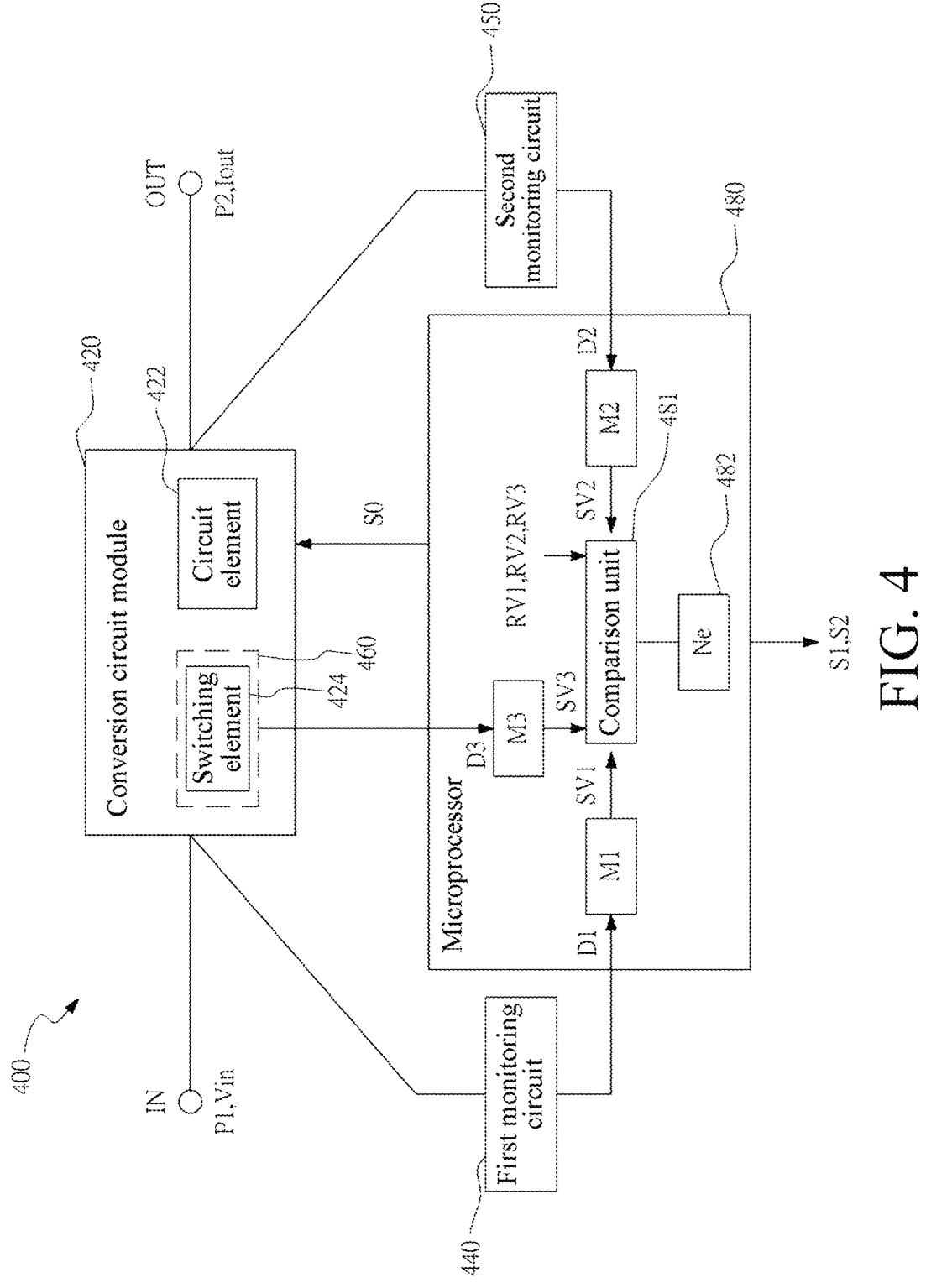
FIG. 4 is a schematic block diagram of a power supply according to a third embodiment of the disclosure.

FIG. 4 is a schematic block diagram of a power supply 400 according to a third embodiment of the disclosure.

Compared with the embodiment in FIG. 3, the power supply 400 in this embodiment further includes a third monitoring circuit 460 in addition to a first monitoring circuit 440 and a second monitoring circuit 450.

The third monitoring circuit 460 is arranged on a conversion circuit module 420, and adapted to detect an operating state of the conversion circuit module 420, to generate a third detected value D3. In an embodiment, the conversion circuit module 420 is a switching power converter, and includes a switching element 424. The third monitoring circuit 460 is a temperature monitoring circuit arranged at a position adjacent to the switching element 424, to detect an operating temperature of the conversion circuit module 420. In this case, the third detected value D3 is a detected temperature value.

In conjunction with the first monitoring circuit 440, the second monitoring circuit 450, and the third monitoring circuit 460 arranged in the power supply 400, a microprocessor 480 stores a first rated physical value RV1, a second rated physical value RV2, a third rated physical value RV3, and a maximum error quantity Ne of a circuit element 422.

The microprocessor 480 estimates a first simulated operating physical value SV1 corresponding to the circuit element 422 based on a first detected value D1, and estimates a second simulated operating physical value SV2 corresponding to the circuit element 422 based on a second detected value D2. In addition, the microprocessor 480 further estimates a third simulated operating physical value SV3 corresponding to the circuit element 422 based on the third detected value D3.

In an embodiment, the microprocessor 480 estimates, by using an intelligent algorithm M3 built in the microprocessor 480, the third simulated operating physical value SV3 (the detected temperature value) based on the third detected value D3. The intelligent algorithm M3 presents a correspondence between a temperature of the third monitoring circuit 460 at a monitoring position and a temperature of the circuit element 422 in a circuit architecture of the conversion circuit module 420. The intelligent algorithm M3 is established through thermal simulation, circuit simulation, data modeling, machine learning, or the like.

In an embodiment, estimation of the third simulated operating physical value SV3 also relates to the second detected value D2 generated by the second monitoring circuit 450 and the first detected value D1 generated by the first monitoring circuit 440. In other words, the second detected value D2 and the first detected value D1 are also parameters of the intelligent algorithm M3.

After the first simulated operating physical value SV1, the second simulated operating physical value SV2, and the third simulated operating physical value SV3 are obtained, the microprocessor 480 compares the first simulated operating physical value SV1 with the first rated physical value RV1, compares the second simulated operating physical value SV2 with the second rated physical value RV2, and compares the third simulated operating physical value SV3 with the third rated physical value RV3.

The microprocessor 480 accumulates a quantity of times that the first simulated operating physical value SV1 exceeds the first rated physical value RV1, a quantity of times that the second simulated operating physical value SV2 exceeds the second rated physical value RV2, and a quantity of times that the third simulated operating physical value SV3 exceeds the third rated physical value RV3. When one of the quantities of times exceeds the maximum error quantity Ne, the microprocessor 480 enables a protection function.

In the foregoing embodiment, a same maximum error quantity Ne is set for a case in which the first rated physical value RV1 is exceeded, a case in which the second rated physical value RV2 is exceeded, and a case in which the third rated physical value RV3 is exceeded. However, the disclosure is not limited thereto. Considering that various error conditions have different degrees of impact on the circuit element 422, in other embodiments, the microprocessor 480 sets different upper limit error quantities for different error conditions, and compares quantities of occurrences of different error states (namely, the case in which the first rated physical value RV1 is exceeded, the case in which that the second rated physical value RV2 is exceeded, and the case in which the third rated physical value RV3 is exceeded) with corresponding upper limit error quantities, to determine whether to enable the protection function.

Figure 5:
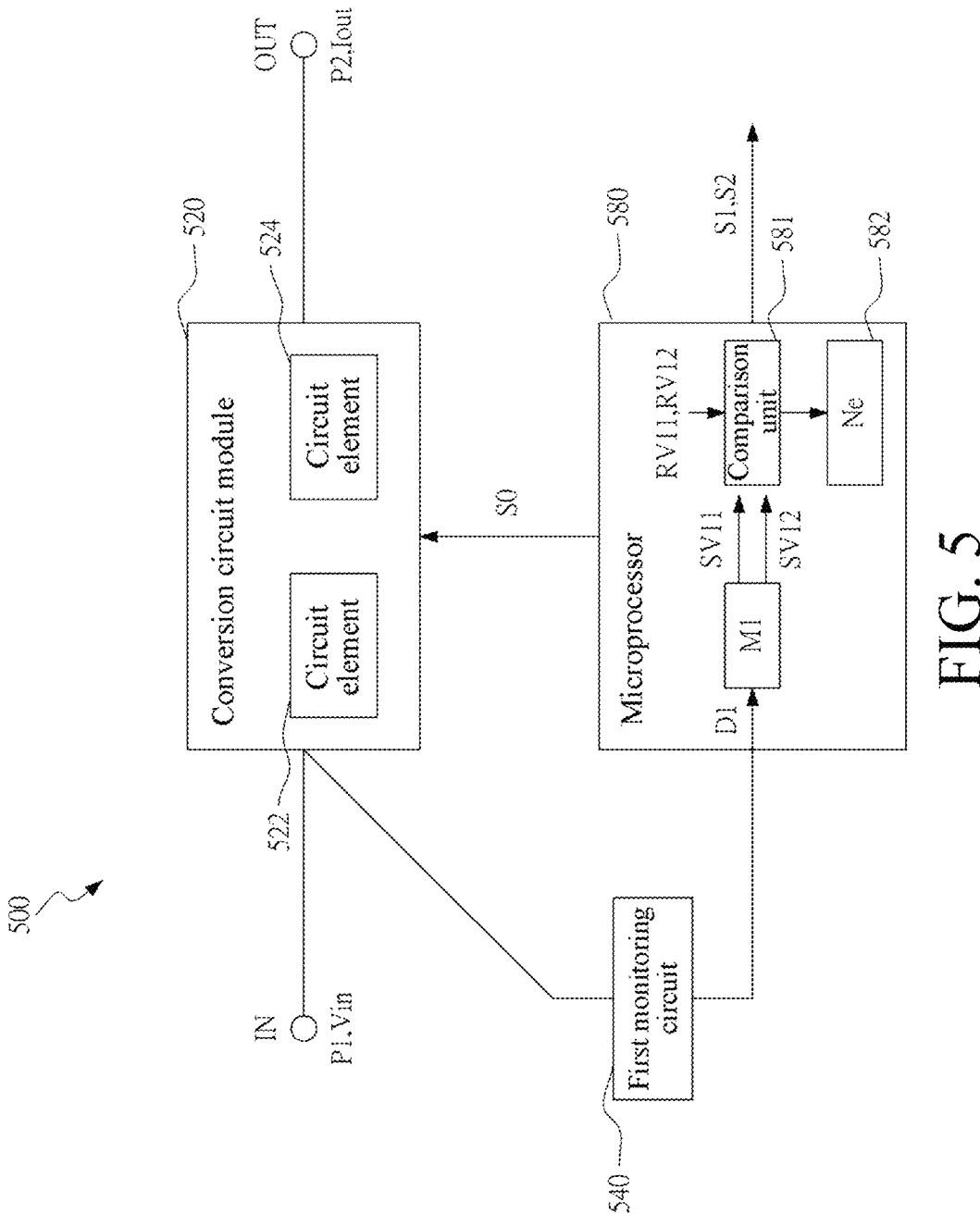
FIG. 5 is a schematic block diagram of a power supply according to a fourth embodiment of the disclosure.

FIG. 5 is a schematic block diagram of a power supply 500 according to a fourth embodiment of the disclosure.

Compared with the embodiment in FIG. 1 in which the microprocessor 180 only monitors a single circuit element 122 in the conversion circuit module 120 to determine whether to enable a protection function, a microprocessor 580 of the power supply 500 in this embodiment stores first rated physical values RV11 and RV12 and upper limit error quantities Ne1 and Ne2 of a plurality of circuit elements (where two circuit elements 522 and 524 are displayed in the figure as examples) in a conversion circuit module 520. In an embodiment, the microprocessor 580 records such data by using a table.

The microprocessor 580 separately estimates first simulated operating physical values SV11 and SV12 corresponding to the circuit elements 522 and 524 based on a first detected value D1 generated by a first monitoring circuit 540. After the first simulated operating physical values SV11 and SV12 corresponding to the circuit elements 522 and 524 are obtained, the microprocessor 580 compares the first simulated operating physical values SV11 and SV12 of the circuit elements 522 and 524 with first rated physical values RV11 and RV12 corresponding to the circuit elements 522 and 524, and accumulates quantities of times that the first simulated operating physical values SV11 and SV12 of the circuit elements 522 and 524 exceed the first rated physical values RV11 and RV12 corresponding to the circuit elements.

When a quantity of occurrences of errors of any one of the circuit elements 522 and 524 exceeds the maximum error quantity Ne1 or Ne2 corresponding to the any one of the circuit elements 522 and 524, the microprocessor 580 immediately enables a protection function.

In conclusion, power supplies 100, 300, 400, and 500 provided in the disclosure include monitoring circuits, which are adapted to detect operating physical values (in an embodiment, voltages, currents, or temperatures) of conversion circuit modules 120, 320, 420, and 520. Microprocessors 180, 380, 480, and 580 estimate, by using the detected operating physical values (namely, a first detected value D1, a second detected value D2, and a third detected value D3 in the disclosure), simulated operating physical values (namely, first simulated operating physical values SV1, SV11, and SV12, a second simulated operating physical value SV2, and a third simulated operating physical value SV3 in the disclosure) of key circuit elements 122, 322, 422, 522, and 524 in conversion circuit modules 120, 320, 420, and 520; and compare the simulated operating physical values with rated physical values (namely, first rated physical values RV1, RV11, and RV12, a second rated physical value RV2, and a third rated physical value RV3) of the circuit elements 122, 322, 422, 522, and 524. In this way, functions of determining safety of the power supplies 100, 300, 400, and 500, estimating service lives of the power supplies 100, 300, 400, and 500, and actively giving a warning are provided without actually detecting the operating physical values of the circuit elements 122, 322, 422, 522, and 524. In addition, according to an embodiment of the disclosure, a single monitoring circuit is used with intelligent algorithms M1, M2, and M3 of the microprocessors 180, 380, 480, and 580, to generate simulated operating physical values corresponding to a plurality of different circuit elements 122, 322, 422, 522, and 524 for determining. This is beneficial to improving determining accuracy and reducing monitoring costs.

The foregoing are only preferred embodiments of the disclosure, and do not limit the disclosure. A person skilled in the art makes any form of equivalent substitutions, modifications, or other changes to the technical means and technical content disclosed in the disclosure without departing from a scope of the technical means of the disclosure, and all the substitutions, modifications, or other changes do not depart from the content of the technical means of the disclosure, and still fall within the scope of protection of the disclosure.

What is claimed is:

1. A power supply, adapted to supply power to an electronic device, wherein the power supply comprises:
an input terminal, receiving an input power;
an output terminal, adapted to supply power to the electronic device;
a conversion circuit module, electrically coupled to the input terminal and the output terminal, adapted to convert the input power into an output power and provide the output power to the output terminal, and comprising a circuit element;
a first monitoring circuit, arranged on the conversion circuit module, and adapted to detect an operating state of the conversion circuit module, to generate a first detected value; and a microprocessor, electrically coupled to the first monitoring circuit, and storing a first rated physical value and a maximum error quantity corresponding to the circuit element, wherein the microprocessor is configured to:
estimate a first simulated operating physical value corresponding to the circuit element based on the first detected value;
compare the first simulated operating physical value with the first rated physical value; and
accumulate a first quantity of times that the first simulated operating physical value exceeds the first rated physical value, and enable a protection function when the first quantity of times exceeds the maximum error quantity.

2. The power supply according to claim 1, wherein the first monitoring circuit is a voltage monitoring circuit, and the voltage monitoring circuit is electrically coupled to the input terminal, to detect an input voltage.

3. The power supply according to claim 2, further comprising a second monitoring circuit, wherein the second monitoring circuit is arranged on the conversion circuit module, and adapted to detect the operating state of the conversion circuit module, to generate a second detected value.

4. The power supply according to claim 3, wherein the second monitoring circuit is a current monitoring circuit, and the current monitoring circuit is electrically coupled to the output terminal, to detect an output current.

5. The power supply according to claim 3, wherein the microprocessor stores a second rated physical value of the circuit element, and the microprocessor is configured to:
estimate a second simulated operating physical value corresponding to the circuit element based on the second detected value;
compare the second simulated operating physical value with the second rated physical value; and
accumulate a second quantity of times that the second simulated operating physical value exceeds the second rated physical value, and enable the protection function when the second quantity of times exceeds the maximum error quantity.

6. The power supply according to claim 3, wherein the maximum error quantity is a first maximum error quantity, the microprocessor stores a second rated physical value of the circuit element and a second maximum error quantity, and the microprocessor is configured to:
estimate a second simulated operating physical value corresponding to the circuit element based on the second detected value;
compare the second simulated operating physical value with the second rated physical value; and
accumulate a second quantity of times that the second simulated operating physical value exceeds the second rated physical value, and enable the protection function when the second quantity of times exceeds the second maximum error quantity.

7. The power supply according to claim 3, wherein the power supply further comprises a third monitoring circuit, arranged on the conversion circuit module, and adapted to detect an operating state of the conversion circuit module, to generate a third detected value.

8. The power supply according to claim 7, wherein the conversion circuit module is a switching power converter and comprises a switching element, and the third monitoring circuit is a temperature monitoring circuit, arranged at a position adjacent to the switching element.

9. The power supply according to claim 7, wherein the microprocessor stores a third rated physical value of the circuit element, and the microprocessor is configured to:

estimate a third simulated operating physical value corresponding to the circuit element based on the third detected value;

compare the third simulated operating physical value with the third rated physical value; and accumulate a third quantity of times that the third simulated operating physical value exceeds the third rated physical value, and enable the protection function when the third quantity of times exceeds the maximum error quantity.

10. The power supply according to claim 1, wherein the microprocessor stores a service life value of the circuit element, and the microprocessor is configured to:

accumulate operating time of the circuit element, and enable the protection function when the operating time exceeds the service life value.

11. The power supply according to claim 1, wherein the protection function is to limit the output power.

12. The power supply according to claim 1, wherein the protection function is to generate a warning signal.

13. The power supply according to claim 1, wherein the protection function is to transmit a warning message to the electronic device.

14. The power supply according to claim 1, wherein the output terminal comprises two power supply contacts and two signal transmission contacts, and the signal transmission contacts are adapted to receive update data by using the electronic device, to update the first rated physical value or the maximum error quantity.

15. A power supply, adapted to supply power to an electronic device, wherein the power supply comprises:

an input terminal, receiving an input power;

an output terminal, adapted to supply power to the electronic device;

a conversion circuit module, electrically coupled to the input terminal and the output terminal, adapted to convert the input power into an output power and provide the output power to the output terminal, and comprising a plurality of circuit elements;

a first monitoring circuit, arranged on the conversion circuit module, and adapted to detect an operating state of the conversion circuit module, to generate a first detected value; and a microprocessor, electrically coupled to the first monitoring circuit, and storing a plurality of first rated physical values and a plurality of maximum error quantities corresponding to the circuit elements respectively, wherein the microprocessor is configured to:

estimate a first simulated operating physical value corresponding to each of the circuit elements based on the first detected value;

compare the first simulated operating physical value corresponding to each of the circuit elements with the corresponding first rated physical value;

accumulate a quantity of times that the first simulated operating physical value corresponding to each of the circuit elements exceeds the corresponding first rated physical value; and enable a protection function when the quantity of times of any one of the circuit elements exceeds the corresponding maximum error quantity.

16. A power supply, adapted to supply power to an electronic device, wherein the power supply comprises:

an input terminal, receiving an input power;

an output terminal, adapted to supply power to the electronic device;

a conversion circuit module, electrically coupled to the input terminal and the output terminal, adapted to convert the input power into an output power and provide the output power to the output terminal, and comprising a circuit element;

a first monitoring circuit, arranged on the conversion circuit module, and adapted to detect an operating state of the conversion circuit module, to generate a first detected value;

a second monitoring circuit, arranged on the conversion circuit module, and adapted to detect an operating state of the conversion circuit module, to generate a second detected value; and a microprocessor, electrically coupled to the first monitoring circuit and the second monitoring circuit, and storing a first rated physical value, a second rated physical value, and a maximum error quantity corresponding to the circuit element, wherein the microprocessor is configured to:

estimate a first simulated operating physical value corresponding to the circuit element based on the first detected value and estimate a second simulated operating physical value corresponding to the circuit element based on the second detected value;

compare the first simulated operating physical value with the first rated physical value, and compare the second simulated operating physical value with the second rated physical value;

accumulate a first quantity of times that the first simulated operating physical value exceeds the first rated physical value;

accumulate a second quantity of times that the second simulated operating physical value exceeds the second rated physical value, and enable a protection function when a sum of the first quantity of times and the second quantity of times exceeds the maximum error quantity.

17. The power supply according to claim 16, wherein the first monitoring circuit is a voltage monitoring circuit, the voltage monitoring circuit is electrically coupled to the input terminal, to detect an input voltage, the second monitoring circuit is a current monitoring circuit, and the current monitoring circuit is electrically coupled to the output terminal, to detect an output current.

* * * * *